United States Patent

Cesari et al.

Patent Number: 5,785,284
Date of Patent: Jul. 28, 1998

[54] DEVICE FOR FASTENING A TEMPERATURE SENSOR IN A MOTOR VEHICLE HEATING AND/OR AIR CONDITIONING INSTALLATION

[75] Inventors: Mario Cesari, Paris; Pascal Cloteaux, Versailles; Jean-Pierre Collgon, Nogent-Le-Rotrou, all of France

[73] Assignee: Valeo Climatisation, La Verriere, France

[21] Appl. No.: 638,285

[22] Filed: Apr. 26, 1996

[30] Foreign Application Priority Data

Apr. 28, 1995 [FR] France .................. 95 05167

[51] Int. Cl.⁶ .................................................. G12B 9/00
[52] U.S. Cl. .................................. 248/27.3; 374/138
[58] Field of Search .......................... 248/27.1, 27.3, 248/220.31, 224.8, 231.9, 231.91, 906; 374/138, 206, 208

[56] References Cited

U.S. PATENT DOCUMENTS

| | | | |
|---|---|---|---|
| 2,525,361 | 10/1950 | Lamb | 73/375 |
| 3,285,548 | 11/1966 | Matto et al. | 248/27.1 |
| 3,288,407 | 11/1966 | Downer et al. | 248/56 |
| 4,304,148 | 12/1981 | Hamman | 74/501 R |
| 5,403,976 | 4/1995 | Maurice | 174/65 R |

FOREIGN PATENT DOCUMENTS

| | | |
|---|---|---|
| 697776 | 10/1967 | Belgium . |
| 2 607 251 | 5/1988 | France . |

*Primary Examiner*—Ramon O. Ramirez
*Assistant Examiner*—Long Dinh Phan
*Attorney, Agent, or Firm*—Morgan & Finnegan, L.L.P.

[57] ABSTRACT

A heating and/or air conditioning installation for a motor vehicle includes a wall having a through hole. A temperature sensor has a heat sensitive element lying in a housing, which may for example be formed in an evaporator of the air conditioning installation. The sensor has protruding connecting wires surrounded by a sheath, and is attached through the hole in the wall by a fastening device. The fastening device comprises a tubular body portion adapted to be removably held fast in the hole, together with a sleeve portion joined to the inside of the body portion and having a passage through which the sheath passes. The sleeve portion has a narrow end which grips the sheath, and a wide end facing towards the heat sensitive element and affording some freedom of lateral movement to the connecting wires.

9 Claims, 1 Drawing Sheet

DEVICE FOR FASTENING A TEMPERATURE SENSOR IN A MOTOR VEHICLE HEATING AND/OR AIR CONDITIONING INSTALLATION

FIELD OF THE INVENTION

This invention relates to a fastening device, for fastening a temperature sensor through an aperture in a wall in a heating and/or air conditioning installation for a motor vehicle, and the like.

BACKGROUND OF THE INVENTION

A fastening device of the above type is known, in particular from French patent specification No. 86 16494, in which the fastening device is intended for use with a temperature sensor comprising a heat sensitive element from which there extend two connecting wires. These wires are surrounded by a sheath. Such devices are used in particular for fastening a temperature sensor, for example a thermistor, in an evaporator which is part of an air conditioning installation for a motor vehicle. In that case, the above mentioned wall is part of a casing which surrounds the evaporator, with the latter incorporating a housing which is aligned with the aperture in the wall, and which is adapted to receive the heat sensitive element of the temperature sensor.

A major disadvantage of known forms of fastening device for use in this context is that they are integral with the heat sensitive element of the temperature sensor, and include resilient lugs for fastening the sensor. As a result, if the temperature sensor has to be removed, it can happen that these lugs become damaged or broken, so that it is then necessary to provide a replacement of the complete temperature sensor with its fastening device, in order that it can subsequently be refitted in the installation.

In addition, a further drawback of known types of fastening device is that they do not permit alignment errors to be taken up: these alignment errors may exist between the aperture in the wall and the housing in the evaporator which lies facing it.

DISCUSSION OF THE INVENTION

A main object of the invention is to overcome the above mentioned disadvantages.

According to the invention, a device for fastening a temperature sensor through an aperture in a wall in a heating and/or air conditioning installation of a motor vehicle is provided in which the temperature sensor has a heat sensitive element and two connecting wires surrounded by a sheath. The device is characterised in that the fastening device comprises a tubular body portion which is adapted to be held fast in the aperture of the wall, together with a sleeve portion which is joined to the interior of the tubular body portion, and which defines a passage for the connecting wires and their sheath. The sleeve portion having a narrow end adapted to grip the sheath and a wide end facing towards the heat sensitive element. The end is adapted to allow the connecting wires freedom for limited lateral displacement.

This fastening device is able to be easily mounted on a wall and removed from the latter without risk of damage. In addition, if the fastening device does become damaged, it can easily be replaced, because it is a separate component from the temperature sensor itself.

In addition, due to the fact that the sleeve portion has a wide end, the fastening device enables the connecting wires to be displaced laterally by a limited amount in order to compensate for any alignment error that may exist between the aperture through the wall and the said housing. For example, the housing can be formed in an evaporator for receiving the heat sensitive element of the temperature sensor.

The sleeve portion of the fastening device preferably has a generally oval transverse cross section.

Preferably, the narrow end of the sleeve portion is provided with a peripheral lip extending inwardly and having a profile which closely matches the cross section of the sheath, to hold the latter fast with respect to the sleeve portion. Consequently, the sheath, and therefore also the connecting wires and the heat sensitive element of the sensor, are held fast axially with respect to the fastening device.

The lip preferably terminates in a sharp edge.

According to a preferred feature of the invention, the wide end of the sleeve portion has an internal cross section of dimensions greater than those of the external cross section of the sheath, whereby to leave the latter free to be displaced. The wide end of the sleeve preferably defines an endwise abutment for the heat sensitive element of the temperature sensor.

According to a further preferred feature of the invention, the tubular body portion is provided with a collar portion which is adapted to bear against a face of the wall, together with at least one retaining nib which is adapted to bear against an opposite face of the wall in this way, the structure holds the tubular body portion fast with respect to the wall. In addition, because of the collar portion, the tubular body portion is sealingly attached to the wall. As a result, the heat sensitive element of the temperature sensor is not in any danger of being disturbed by outside influences.

Preferably, the tubular body portion of the fastening device is provided with an extraction tongue disposed at the end of the body portion corresponding to the narrow end of its sleeve portion. This extraction tongue facilitates extraction of the fastening device from the wall in the event that the temperature sensor requires to be removed. The extraction tongue is preferably an axial extension of the tubular body portion.

According to yet another preferred feature of the invention, the fastening device is made in one piece by moulding in a plastics material.

The various features and advantages of the invention will be better understood on a reading of the following detailed description of a preferred embodiment of the invention, which is given by way of nonlimiting example only and with reference to the accompanying drawings.

DESCRIPTION OF A PREFERRED EMBODIMENT OF THE INVENTION

Figure 1:
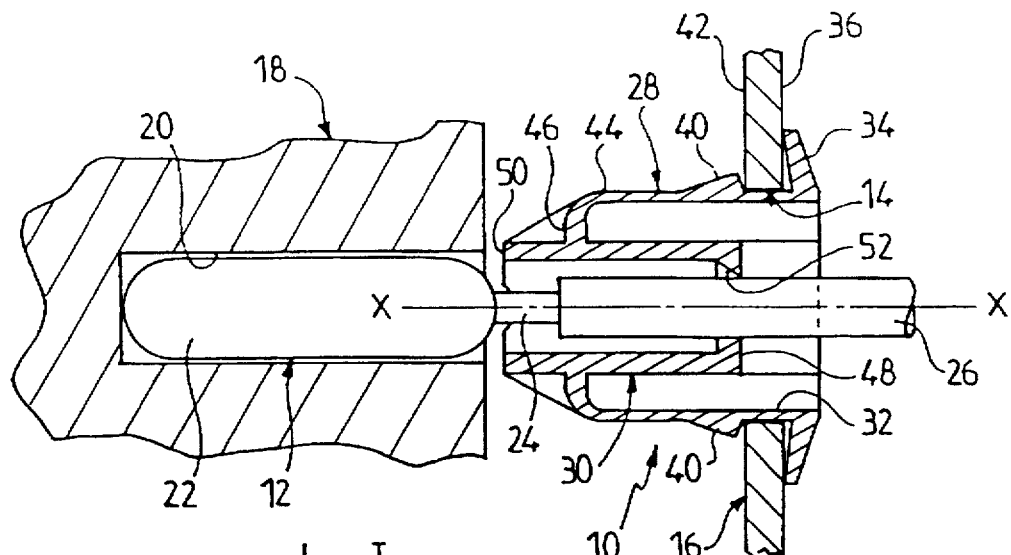
FIG. 1 a view in transverse cross section of a device in accordance with the invention which is used for fastening a temperature sensor through an aperture in a wall of a casing that surrounds an evaporator in a motor vehicle air conditioning installation, the cross section of FIG. 1 being taken on the line I—I in FIG. 2.

Reference is first made to FIG. 1, which shows a device 10 for fastening a temperature sensor 12 through a circular aperture 14 in a wall 16. This wall is part of a casing in a heating and/or air conditioning installation for a motor vehicle, and it surrounds an evaporator 18.

The evaporator 18 comprises a cylindrical housing 20, the axis of which is generally aligned with the axis XX of the circular aperture 14. The cylindrical housing 20 is designed for receiving a heat sensitive element 22, for example a thermistor, which is the main part of the temperature sensor 12. The heat sensitive element 22 is connected electrically to two connecting wires 24, which are surrounded by a sheath 26 of a suitable plastics material, having a substantially oval right cross section.

Figure 2:
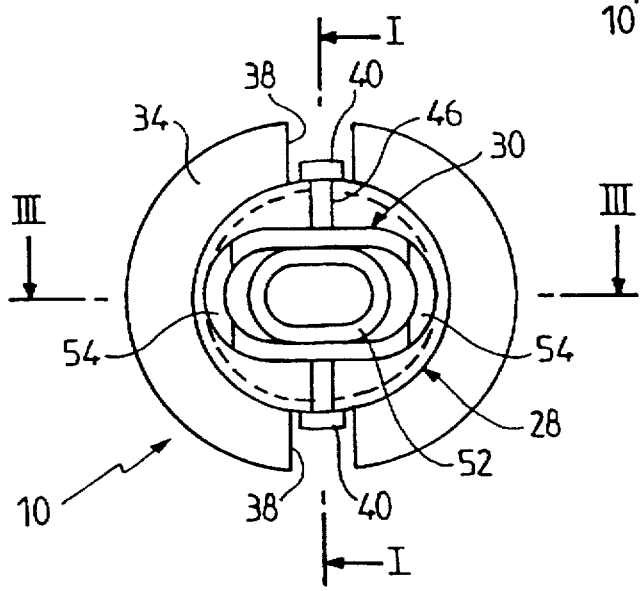
FIG. 2 is an end view of the device of FIG. 1.
Figure 3:
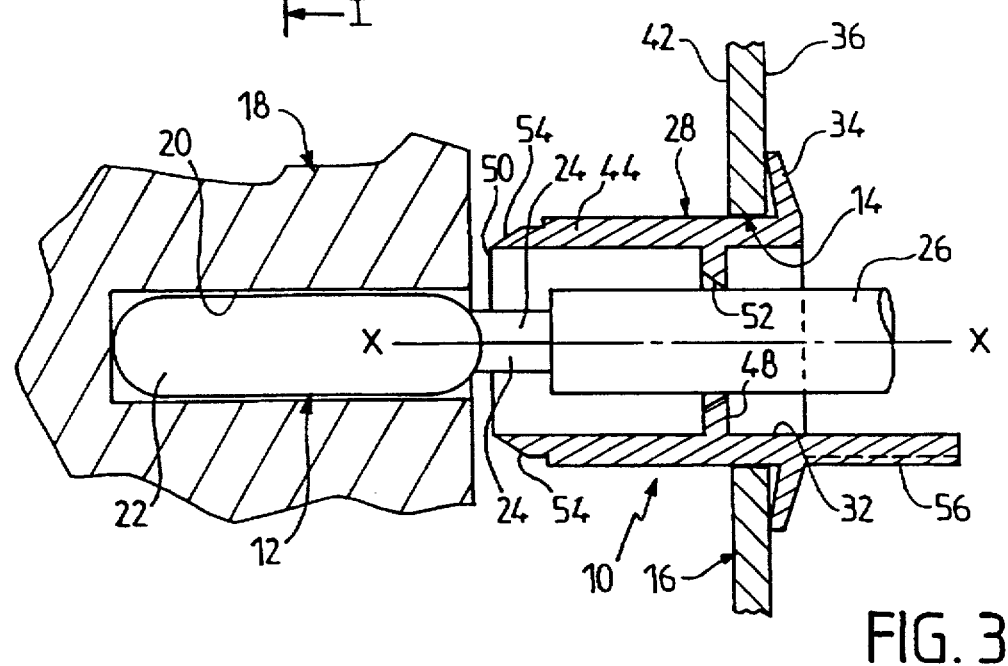
FIG. 3 is a view of the device in cross section taken on the line III—III in FIG. 2.

As is shown in FIGS. 1 to 3, the fastening device 10 comprises a tubular body portion 28 which is adapted to be introduced and held fast in the aperture 14 in the wall 16, together with a sleeve portion 30 which is joined to the interior of the tubular body portionn 28, and which defines a passage for the connecting wires 24 and their sheath 26. The tubular body portion 28 has a circular cross section which is matched to the dimensions of the circular aperture 14 in the wall 16. It has a first end portion 32 which includes a collar portion 34 arranged to bear against an external face 36 of the wall 16. The collar portion 34 is formed with two diametrically opposed notches 38, FIG. 2.

The tubular body portion 28 is formed with two retaining nibs 40, which are diametrically opposed to each other and which are aligned with the two notches 38. The two retaining nibs 40 are arranged to bear against an internal face 42 of the wall 16, which is opposed to the external face 36 of the latter. The retaining nibs 40 are in the form of ramps inclined with respect to the axial direction of the tubular body portion 28. The device 10 can thus be introduced through the aperture 14, so that the two retaining nibs 40 are displaced towards each other as they pass through the aperture, after which they move apart again to be applied against the face 42 of the wall 16 once the device has been fully inserted in the aperture 14. In this position, the device is immobilised axially, with the collar portion 34 bearing against the external face 36 of the wall 16 and the nibs 40 bearing against its internal face 42. This also produces a sealed fastening. The tubular body portion 28 further includes another end portion 44, to the inside of which the sleeve portion 30 is attached through a base portion 46.

The sleeve portion 30 has a generally oval transverse cross section the dimensions of which are greater than those of the outer cross section of the sheath 26. The sleeve portion 30 has a narrow end 48 which is arranged to grip the sheath 26, and a wide end 50 which faces towards the heat sensitive element 22, and which enables enable the connecting wires 24 and their sheath 26 to undergo limited lateral displacement. The narrow end 48 of the sleeve portion 30 is provided with a peripheral lip 52 which is directed inwardly, and which has a profile that closely matches the external cross section of the sheath 26. In this example, the lip 52 is terminated by a sharp edge. As a result, the peripheral lip 52 exerts a gripping action on the sheath 26, and holds the latter fast in position with respect to the device itself.

The wide end 50 of the sleeve portion 30 has an internal cross section which is of dimensions greater than those of the outer cross section of the sheath, so as to leave the latter free to be displaced laterally. The sheath is thus able to be displaced in two dimensions, to compensate for any error in alignment between the axis of the housing 20 and the axis XX of the aperture 14.

The heat sensitive element 22 of the temperature sensor 12 may lie a short distance away from the wide end 50 of the sleeve portion 30, or it may alternatively be in abutting engagement against that end 50.

As can be seen in particular in FIGS. 2 and 3, the wide end 50 of the sleeve portion has two symmetrical and opposed chamfers 54 which are formed in the region of the two semicircular portions of the end 50. The purpose of these two chamfers 54 is simply to facilitate introduction of the wide end 50 of the fastening device 10 through the aperture 14 of the wall during fitting of the fastening device. As is best seen in FIG. 3, the tubular body portion 28 is provided with an extraction tongue 56 which is an axial extension of the tubular body portion. This tongue 56 projects from the root of the collar portion 34, that is to say it is disposed at the end of the body portion 28 corresponding to the narrow end 48 of the sleeve portion 30. The purpose of this tongue is essentially to facilitate extraction of the fastening device in the event that the temperature sensor 12 has to be removed. By pulling on the extraction tongue 56, the fastening device is brought out of the wall 16, with the two retaining nibs 40 being urged resiliently towards each other during this extraction movement. In practice the fastening device 10 is not damaged, and may easily be subsequently refitted.

However, if the fastening device should have become accidentally damaged, it can easily be replaced without it being necessary to exchange the temperature sensor itself.

The fastening device 10 is preferably made in one piece by moulding in a suitable plastics material.

The fastening device of the invention, for example in the embodiment described above, is especially useful for the fastening of a temperature sensor in a heating and/or air conditioning installation of a motor vehicle. However, the temperature sensor is not limited to one intended for use in an evaporator as described above by way of example only, and in consequence the fastening device is similarly useful in other applications.

What is claimed is:

1. In combination, a thermoelectric temperature sensing means comprising a housing, a wall, and a fastening device securing the thermoelectric temperature sensing means to said wall, the wall having a through aperture, the temperature sensing means having a thermoelectric temperature sensor, at least two connecting electrical conducting wires extending from said sensor, and a sheath having a cross section surrounding said electrical conducting wires, wherein the fastening device has a tubular body portion adapted to be held fast in said aperture in the wall, and a sleeve portion joined to the inside of the tubular body portion and defining a passage through which said wires and sheath extend, the sleeve portion having a narrow end gripping the sheath and a wide generally oval transverse cross section end facing towards said sensor, said wide, oval end being dimensioned to allow the connecting electrical conducting wires to be displaced laterally to compensate for alignment error between the aperture and the housing.

2. The combination of claim 1, wherein said narrow end of said sleeve portion defines a peripheral lip directed inwardly and having a profile closely matching said sheath cross section, whereby to hold said sheath fast with respect to said sleeve portion.

3. The combination of claim 2, wherein the said lip has a sharp terminal edge.

4. The combination of claim 1, wherein said wide end of said sleeve portion has an internal cross section defining dimensions greater than those of said sheath cross section, whereby to enable said sheath to be displaced laterally.

5. The combination of claim 1, wherein said wide end of said sleeve portion defines an abutment for said sensor.

6. The combination of claim 1, said wall having a first face and a second face opposed to said first face thereof, said tubular body portion of the fastening device having a collar portion for bearing against said first face of the wall and at least one retaining nib for engagement against said second face of the wall, whereby to hold said tubular body portion fast with respect to said wall.

7. The combination of claim 1, wherein said tubular body portion of said fastening device further includes an extraction tongue disposed at the end thereof corresponding to said narrow end of the sleeve portion.

8. The combination of claim 7, wherein said extraction tongue constitutes an axial extension of said tubular body portion.

9. The combination of claim 1, wherein said fastening device is formed in one piece by molding in a plastics material.

* * * * *